United States Patent
Wagner et al.

(10) Patent No.: US 9,612,661 B2
(45) Date of Patent: Apr. 4, 2017

(54) CLOSED LOOP FEEDBACK INTERFACE FOR WEARABLE DEVICES

(71) Applicant: Wearable Devices, Ltd., Kiryat Tivon (IL)

(72) Inventors: Guy Wagner, Kiryat Tivon (IL); Leeor Langer, Kiryat Tivon (IL); Asher Dahan, Or Akiva (IL)

(73) Assignee: Wearable Devices Ltd., Yokneam-Illit (IL)

( * ) Notice: Subject to any disclaimer, the term of this patent is extended or adjusted under 35 U.S.C. 154(b) by 0 days.

(21) Appl. No.: 14/588,592

(22) Filed: Jan. 2, 2015

(65) Prior Publication Data
US 2016/0195928 A1    Jul. 7, 2016

(51) Int. Cl.
*G06F 3/01*     (2006.01)
*G09G 5/00*     (2006.01)
(Continued)

(52) U.S. Cl.
CPC .............. *G06F 3/016* (2013.01); *G06F 1/163* (2013.01); *G06F 3/015* (2013.01); *G06F 3/017* (2013.01);
(Continued)

(58) Field of Classification Search
CPC ..... G06F 3/016; G06F 3/017; G06F 2203/014
See application file for complete search history.

(56) References Cited

U.S. PATENT DOCUMENTS

| 8,170,656 B2 * | 5/2012 | Tan .................. G06F 1/163 345/157 |
| 8,447,704 B2 | 5/2013 | Tan et al. |

(Continued)

OTHER PUBLICATIONS

Bonato P. et al., "A Statistical Method for the Measurement of Muscle Activation Intervals from Surface Myoelectric Signal During Gait", IEEE Transactions on Biomedical Engineering (1998), vol. 45, No. 3, pp. 287-299.

(Continued)

*Primary Examiner* — Ricardo L Osorio
(74) *Attorney, Agent, or Firm* — Pearl Cohen Zedek Latzer Baratz LLP

(57) ABSTRACT

A gesture controlled system wearable by a user and operationally connected to a computerized device, the system comprising: at least one bio-potential sensor; at least one motion sensor; at least one haptic feedback actuator capable of creating haptic feedback corresponding to signals from the computerized device; a memory module, having a database with known records representing different gestures and a gesture prediction model; a signal processor, capable of identifying signal parameters from the sensors as known gestures; and a communication controller capable of transmitting information from the signal processor to the computerized device, wherein the at least one bio-potential sensor and the at least one feedback actuator are in direct contact with the skin of the user, wherein identified signals from the signal processor are transmitted to the computerized device, and wherein the at least one haptic feedback actuator is configured to allow reading text from the computerized device.

19 Claims, 13 Drawing Sheets

(51) Int. Cl.
  *G06F 1/16* (2006.01)
  *G06F 3/038* (2013.01)

(52) U.S. Cl.
  CPC ............. *G06F 3/038* (2013.01); *G09G 5/003* (2013.01); *G09G 2370/16* (2013.01)

(56) References Cited

U.S. PATENT DOCUMENTS

| | | | |
|---|---|---|---|
| 8,935,119 B2 | 1/2015 | Yuen | |
| 8,994,827 B2 | 3/2015 | Mistry et al. | |
| 9,030,446 B2 | 5/2015 | Mistry et al. | |
| 9,037,530 B2 | 5/2015 | Tan et al. | |
| 9,079,060 B2 | 7/2015 | Hong et al. | |
| 9,104,271 B1 | 8/2015 | Adams et al. | |
| 9,170,674 B2 | 10/2015 | Forutanpour et al. | |
| 2014/0198035 A1* | 7/2014 | Bailey ............... | G06F 3/014 345/156 |
| 2014/0240103 A1* | 8/2014 | Lake ............... | G08C 17/02 340/12.5 |
| 2014/0240223 A1 | 8/2014 | Lake et al. | |
| 2014/0334083 A1* | 11/2014 | Bailey ............... | G06F 1/163 361/679.03 |
| 2015/0293592 A1* | 10/2015 | Cheong ............ | G06F 3/016 345/173 |
| 2015/0366504 A1* | 12/2015 | Connor ............ | A61B 5/6804 600/301 |

OTHER PUBLICATIONS

Severini G. et al., "Novel formulation of a double threshold algorithm for the estimation of muscle activation intervals designed for variable SNR environments", Journal of Electromyography and Kinesiology (2012), vol. 22, pp. 878-885.
Jiang N. et al., "Myoelectric control of artificial limbs—is there a need to change focus", IEEE Signal Processing Magazine (2012), vol. 29, No. 5, pp. 152-150.
Hamedi M. et al., "EMG-based facial gesture recognition through versatile elliptic basis function neural network", BioMedical Engineering OnLine (2013), vol. 12, No. 73.
Pamungkas D. et al., "Electro-Tactile Feedback for Tele-operation of a Mobile Robot", Proceedings of Australasian Conference on Robotics and Automation, University of New South Wales, Australia (2013).
Peruzzini M. et al., "Electro-tactile device for material texture simulation", The International Journal of Advanced Manufacturing Technology (2013), vol. 68(9-12), pp. 2185-2203.
Kruijff E. et al., "Using neuromuscular electrical stimulation for pseudo-haptic feedback", Proceedings of the ACM symposium on Virtual reality software and technology (2006), pp. 316-319.
Bach-y-Rita, P., "Tactile sensory substitution studies", Annals—New York Academy of Sciences (2004), vol. 1013, pp. 83-91.
Office Action for U.S. Appl. No. 15/202,750 dated Sep. 29, 2016.

\* cited by examiner

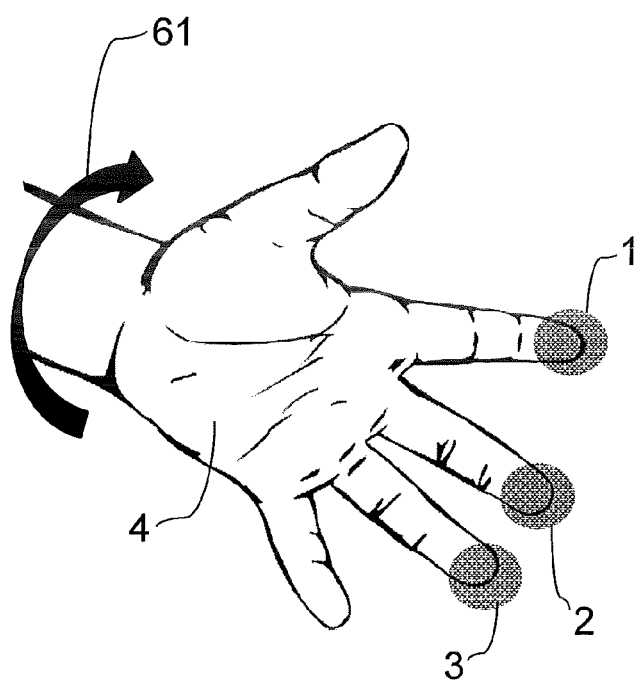
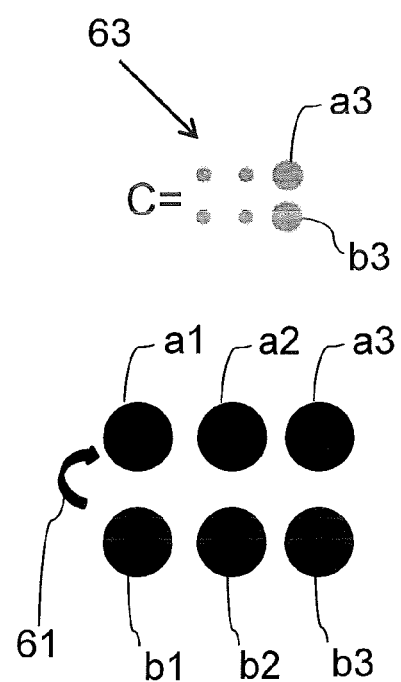
Fig. 6A                    Fig. 6B

CLOSED LOOP FEEDBACK INTERFACE FOR WEARABLE DEVICES

FIELD OF THE INVENTION

The present invention relates to wearable devices. More particularly, the present invention relates to EMG based interfaces for wearable devices.

BACKGROUND OF THE INVENTION

Natural language is intuitive for human communication. It relies on the spoken language, yet it is subconsciously based on body and hand gestures, where constant feedback is provided by the onlookers, for example via subtle body language, reacting to a speaker. On the other hand, human computer interfaces are not based on subtle human skills and are therefore cumbersome and unintuitive when compared to human spoken language and body language. Another example of a natural intuitive communication is music instruments such as violin or piano, where the musician uses gesture like movements to produce sound which is also used as an auditory feedback. In such a system the trained musician can play the instrument with no eye contact, with such feedback increasing the learning speed.

For many years, human-computer interactions have been mostly carried out using a standard "QWERTY" keyboard, with a screen providing a user with visual feedback of the keyboard (and mouse) input. With the constantly improving technology of computerized devices, these keyboards have now become a cumbersome means of communication. Currently, the most significant developments in the field of smart interfaces are based on computer vision using cameras and video analysis. However, this approach is limited due to the complexity of the visual data.

In recent years the touchscreen interface has become one of the most common solutions for inputting text or giving general instructions to the computer, whereby the touchscreen replaces the standard keyboard and mouse. However, using a touchscreen requires full concentration of the eyes and fingers on the screen, and an interface without the necessity of a direct view to the screen is not available today.

In search of more intuitive means for human computer interaction, other solutions such as voice recognition and gesture recognition (using a built-in microphone and/or camera) have become available in recent years; however these solutions have not been able to provide an accurate interpretation of the input. Voice recognition is based on one signal that cannot be easily deciphered (without a set of additional signals), while gesture recognition is based on computer vision and therefore highly sensitive to numerous ambient parameters.

An additional solution that has transitioned from medical applications (such as prosthesis biomechanical solutions) to generic human computer interfaces is a surface electromyography (sEMG) based device, providing recognition of coarse hand gestures for basic commands (e.g. controlling the grasp of a prosthesis) where the sEMG sensor is located near the elbow. However, such devices cannot easily detect subtle movements of the hand, for instance movement of a single finger, and therefore cannot effectively be used as an interface for a wider range of gestures. In addition, such devices require a sEMG sensor array to be located slightly below the elbow, which is an inconvenience for most users and therefore not yet widely accepted outside the medical community. Other devices are intended for the visually impaired and have a physical Braille display, but they do not provide a sEMG based interface and therefore cannot detect gestures. U.S. Pat. No. 8,447,704 describes an interface for recognition of a predefined set of general gestures based on sEMG signals.

There is therefore a need for an efficient and intuitive user interface for computerized machines that can recognize different types of subtle gestures (defined by the user) based on EMG signals. Moreover, with the development of Internet of Things (IoT) applicable devices, particularly wearable smart-watches, computer interfaces based on screens are becoming smaller and less convenient for complex interaction, due to the difficulty in closing a feedback loop between the user and the computerized device.

SUMMARY OF THE INVENTION

In a first aspect of the invention a gesture controlled system wearable by a user and operationally connected to a computerized device is provided, the system comprising:
at least one bio-potential sensor;
at least one motion sensor capable of detecting movement;
at least one haptic feedback actuator capable of creating haptic feedback corresponding to signals from the computerized device;
a memory module, having a database with known records representing different gestures and a gesture prediction model;
a signal processor, capable of identifying signal parameters from the at least one bio-potential sensor and the at least one motion sensor as known gestures from the database according to the gesture prediction model; and
a communication controller capable of transmitting information from the signal processor to the computerized device,
wherein the at least one bio-potential sensor and the at least one haptic feedback actuator are in direct contact with the skin of the user, wherein identified signals from the signal processor are transmitted to the computerized device, and wherein the at least one haptic feedback actuator is configured to allow reading text from the computerized device, with conversion of the text into different haptic feedback corresponding to specific letters, words and predetermined data types.

In some embodiments, the system further comprises a display interface capable of displaying information from the signal processor.

In some embodiments, the system is capable of fitting onto a wrist of the user, and detects electrical signals from nerve bundles in the wrist.

In some embodiments, the system further comprises at least one heart rate sensor capable of detecting the heart rate of the user as additional input for the signal processor.

In some embodiments, the heart rate sensor is selected from a group including an optical sensor, an electrocardiogram (ECG) sensor, and a skin conductivity sensor.

In some embodiments, the bio-potential sensor is selected from a group including a surface electromyography (sEMG) sensor, a capacitive electromyography (cEMG) sensor, and a surface nerve conduction (SNC) sensor.

In some embodiments, the communication controller is a wireless communication controller.

In some embodiments, the wireless communication controller is a Bluetooth Low Energy (BLE) controller.

In some embodiments, the wireless communication controller is configured to allow cloud connectivity between the signal processor and an external data storage cloud.

In some embodiments, the at least one motion sensor is a Micro-Electro-Mechanical System (MEMS).

In some embodiments, the at least one motion sensor is selected from a group including an accelerometer, a gyroscope, and a magnetometer.

In some embodiments, the signal processor is configured to allow detection of hand writing gestures.

In some embodiments, the at least one haptic feedback actuator is an electro-tactile stimulation actuator.

In a second aspect of the invention a gesture controlled system wearable by a user and connected to a computerized device is provided, the computerized device having a memory module, having a database with known and labeled gestures and a gesture prediction model, and a signal processor, capable of identifying signal parameters as known gestures from the database, and the system comprising:
at least one bio-potential sensor;
at least one motion sensor capable of detecting movement;
at least one haptic feedback actuator;
a communication controller capable of transmitting information to the computerized device;
wherein the at least one bio-potential sensor and the at least one haptic feedback actuator are in direct contact with the skin of the user, wherein the processing of the signal from the sensors is carried out at the signal processor of the computerized device, and wherein the at least one haptic feedback actuator is configured to allow reading text from the computerized device with different haptic feedback corresponding to specific letters, words and predefined data types.

In some embodiments, the system further comprises a display.

In some embodiments, the system further comprises at least one heart rate sensor capable of detecting the heart rate of the user.

In some embodiments, the communication controller is a wireless communication controller.

In a third aspect of the invention a method for communication between a gesture controlled system and a computerized device is provided, the method comprising:
providing the gesture controlled system;
calibrating the gesture controlled system to recognize a set of gestures;
detecting a movement by at least one of the sensors;
checking if the movement is a recognized gesture;
executing a command corresponding to a recognized gesture from the database on the computerized device; and
activating the at least one haptic feedback actuator for feedback corresponding to the executed command on the computerized device.

In some embodiments, the method further comprises providing at least one heart rate sensor capable of detecting the heart rate of the user, and wherein the calibration is carried out when a predetermined value of the heart rate is measured.

In a fourth aspect of the invention a stimulation system is provided, the stimulation system comprising:
at least one electro-tactile stimulation actuator; and
at least one bio-potential sensor,
wherein the sensors are combined into a single stimulation unit such that the same circuit is used for sensing and also for tactile stimulation.

The stimulation system of claim 20, further comprising a galvanic skin response (GSR) sensor combined into the single stimulation unit such that the same circuit is used for sensing, for tactile stimulation, and also for detection of heart rate.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the specification, including definitions, will control. In addition, the materials, methods, and examples are illustrative only and not intended to be limiting.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding of the invention, the description taken with the drawings making apparent to those skilled in the art how the several forms of the invention may be embodied in practice.

IN THE DRAWINGS

Figures 1A, 1B:
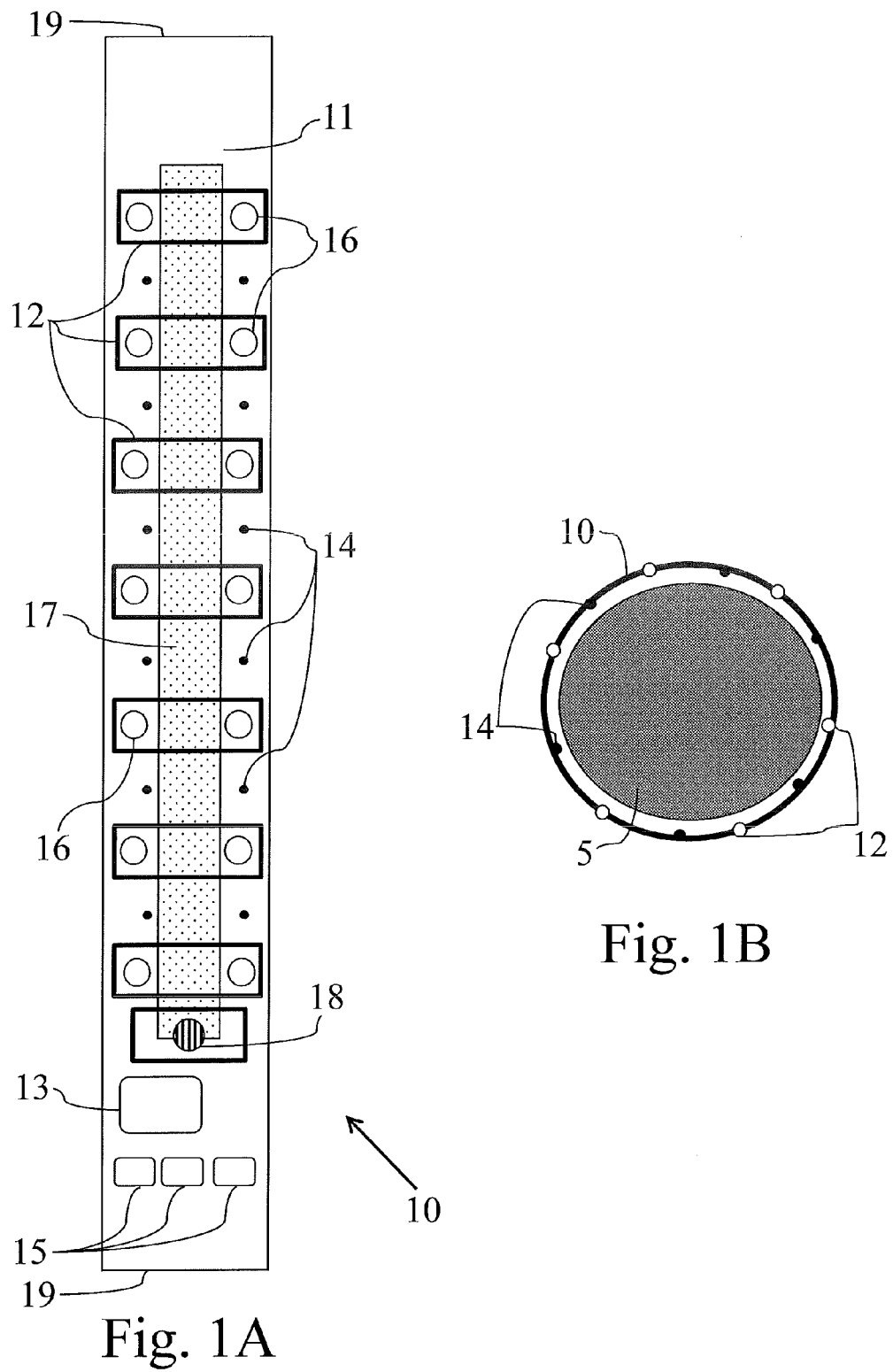

FIG. 1A schematically illustrates a frontal view of a flexible interface, according to an exemplary embodiment.

FIG. 1B schematically illustrates a cross-sectional view of the flexible PCB interface surrounding a wrist of a user, according to an exemplary embodiment.

Figure 2:
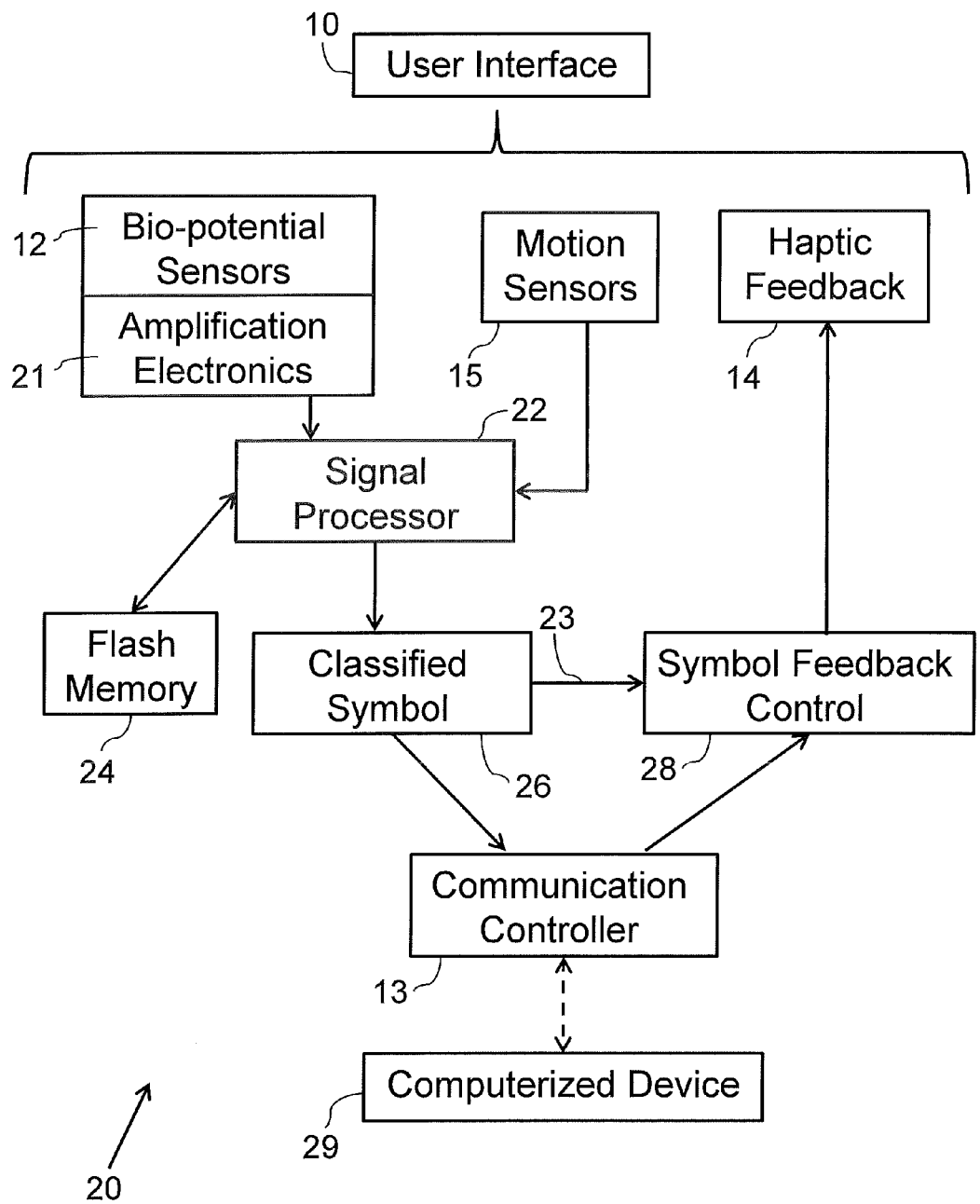

FIG. 2 depicts a block diagram of a gesture controlled system showing the information flow between a user interface and a computerized device, according to an exemplary embodiment.

Figure 3:
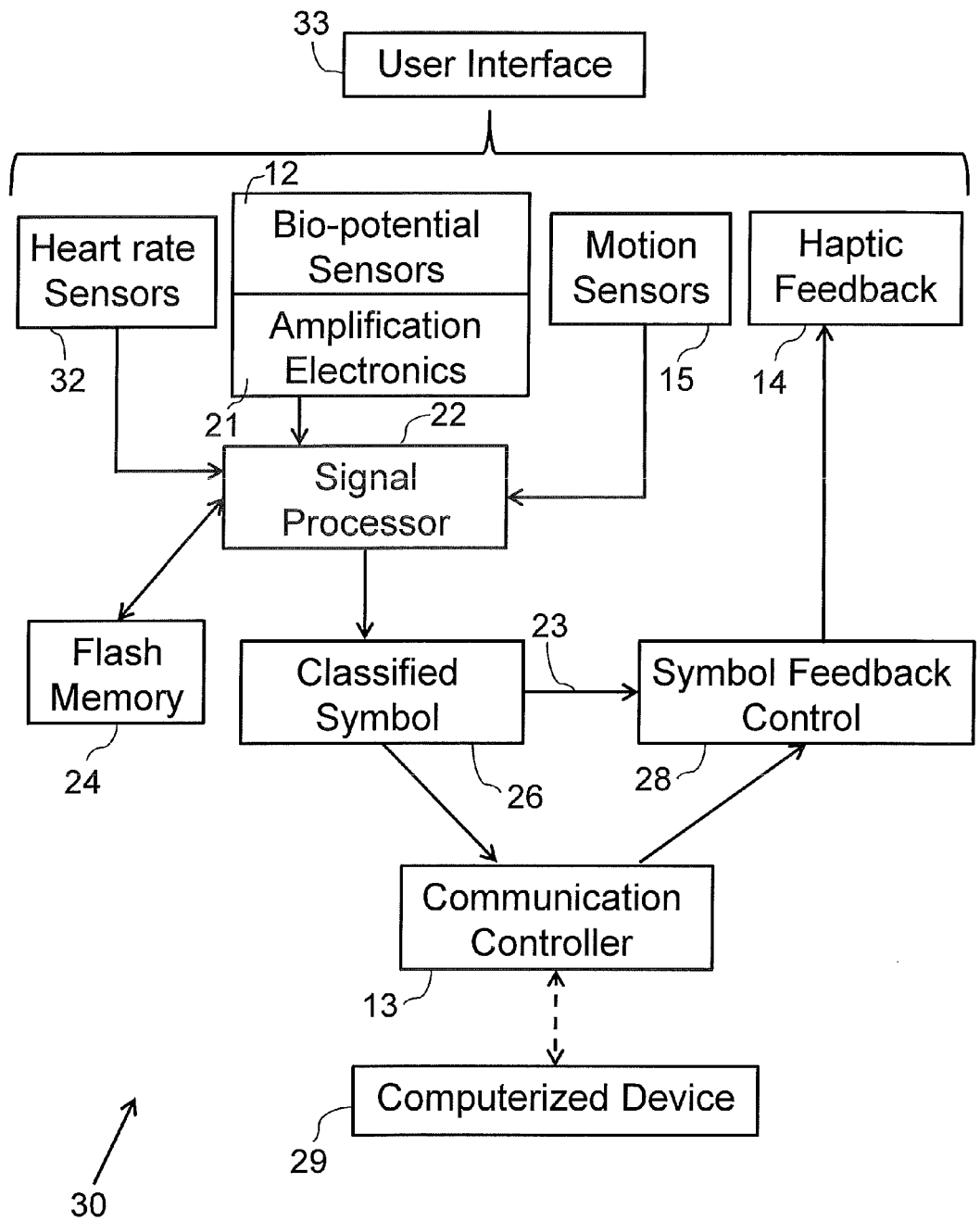

FIG. 3 depicts a block diagram of a gesture controlled system having additional heart rate sensors, showing the information flow between the user interface and a computerized device, according to an exemplary embodiment.

Figure 4A:
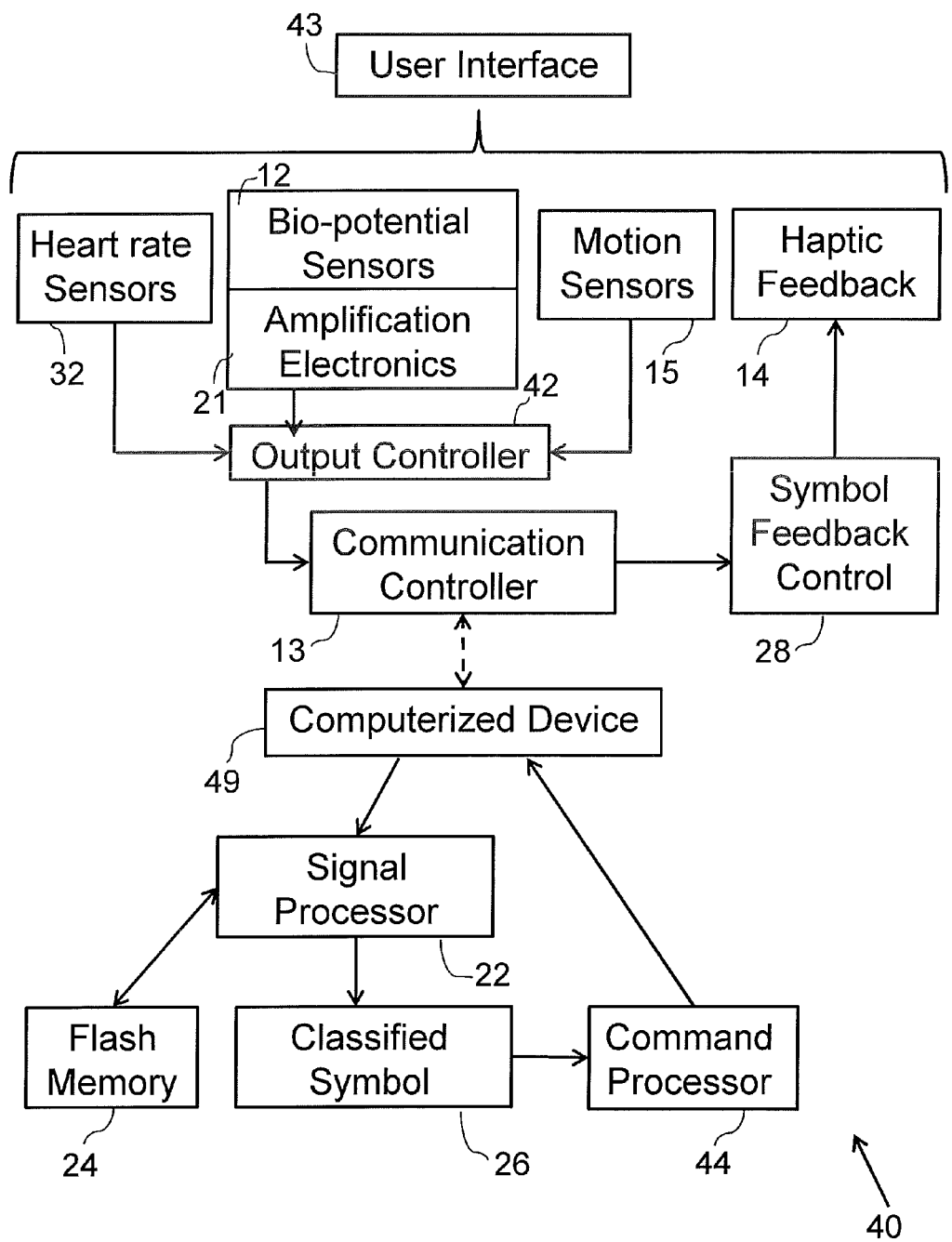

FIG. 4A depicts a block diagram of a gesture controlled system wherein all processing is carried out at a computerized embedded device, according to an exemplary embodiment.

Figure 4B:
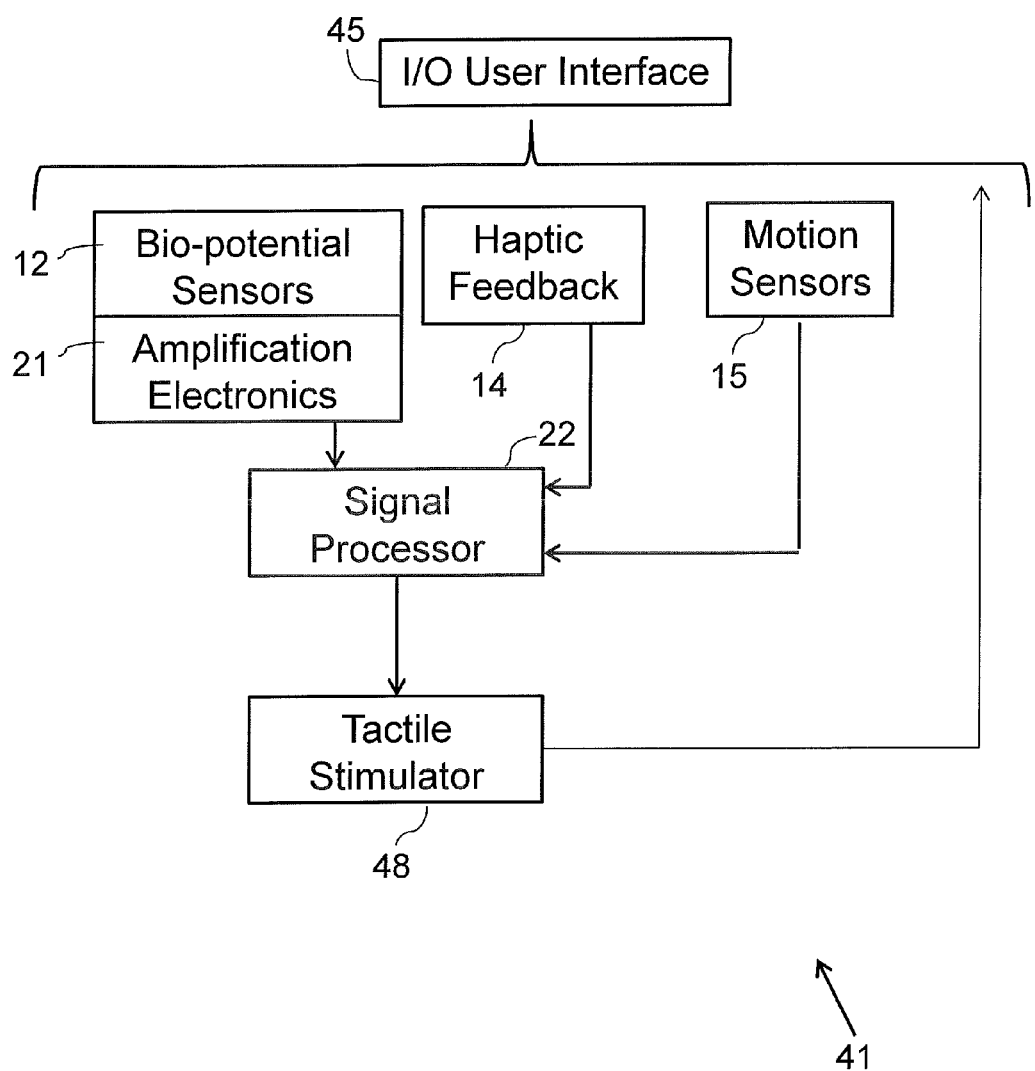

FIG. 4B depicts a block diagram of a gesture controlled system with an input/output interface, according to an exemplary embodiment.

Figure 5:
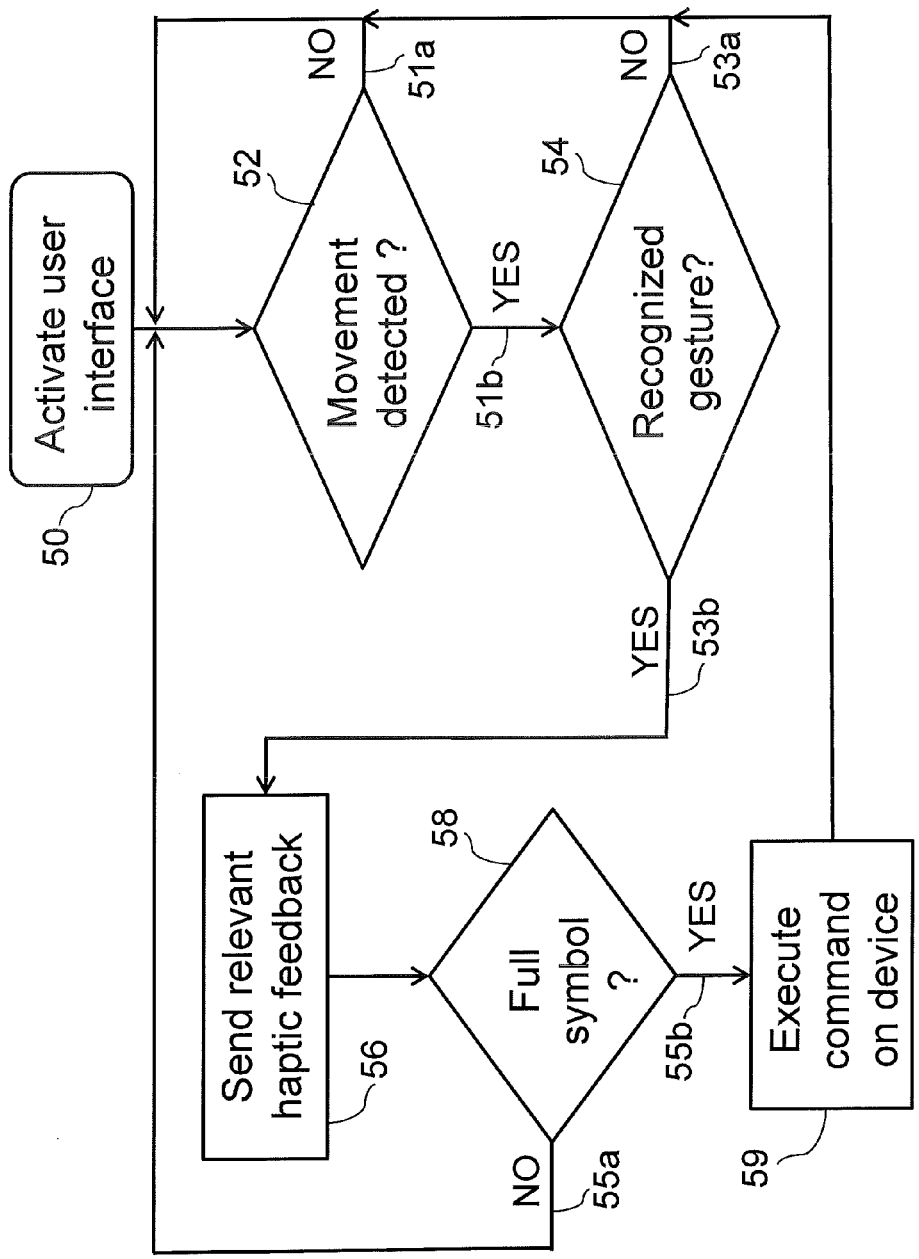

FIG. 5 depicts a flow chart for writing text using the gesture controlled system, according to an exemplary embodiment.

FIG. 6A schematically illustrates the hand of the user, according to an exemplary embodiment.

FIG. 6B schematically illustrates the symbol for the letter "C" in Braille.

Figure 7A:
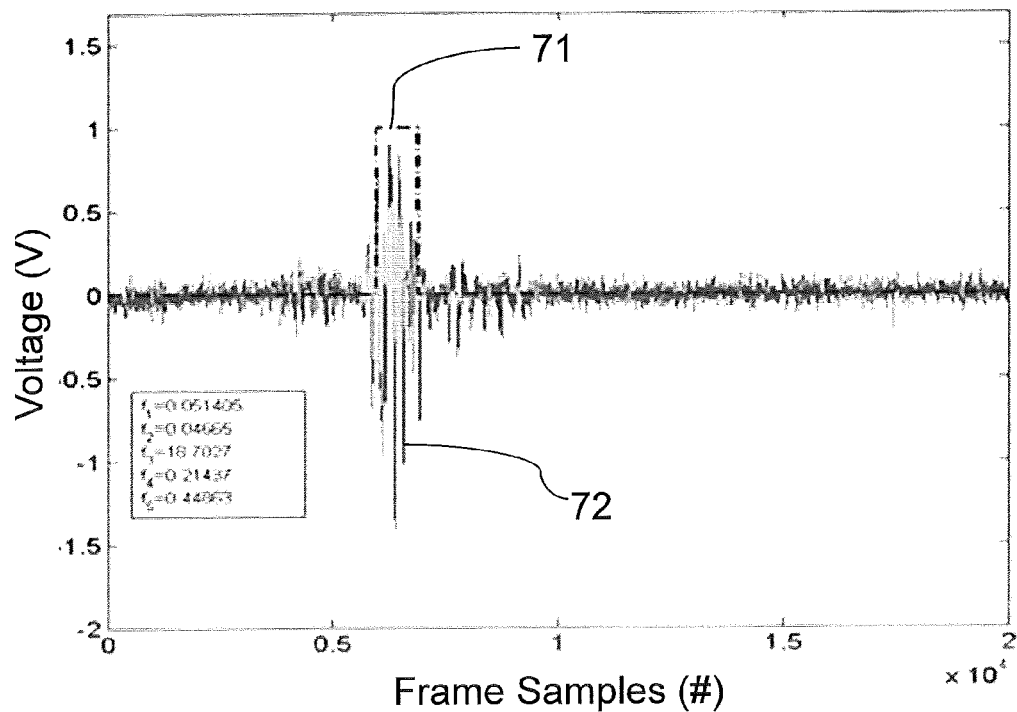

FIG. 7A shows a signal generated by an index finger movement.

Figure 7B:
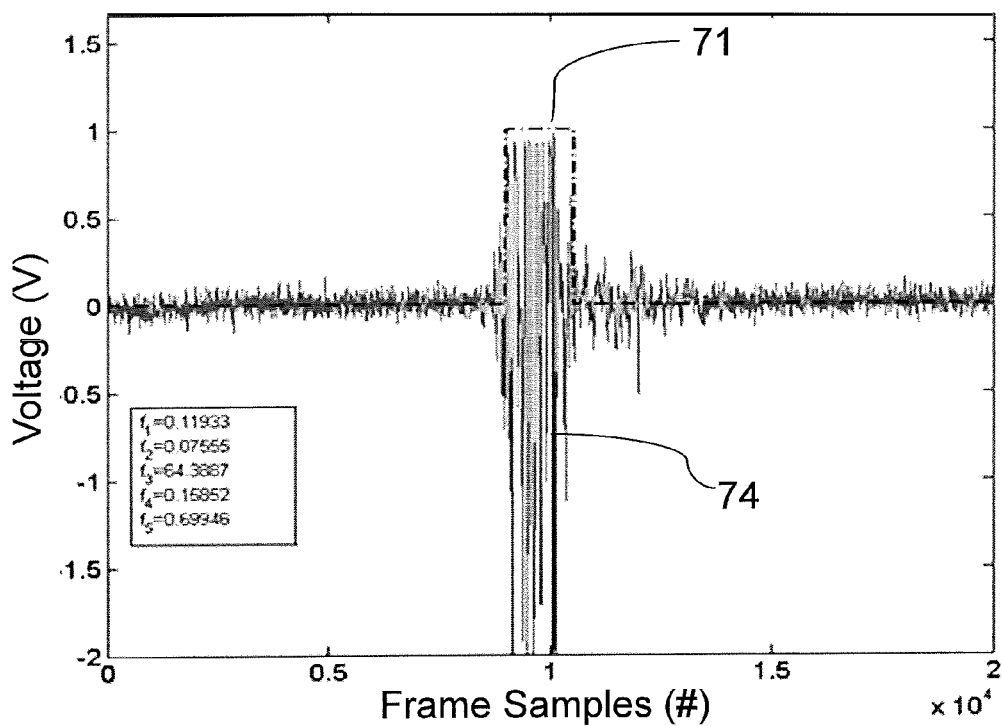

FIG. 7B shows a signal generated by a middle finger movement.

Figure 7C:
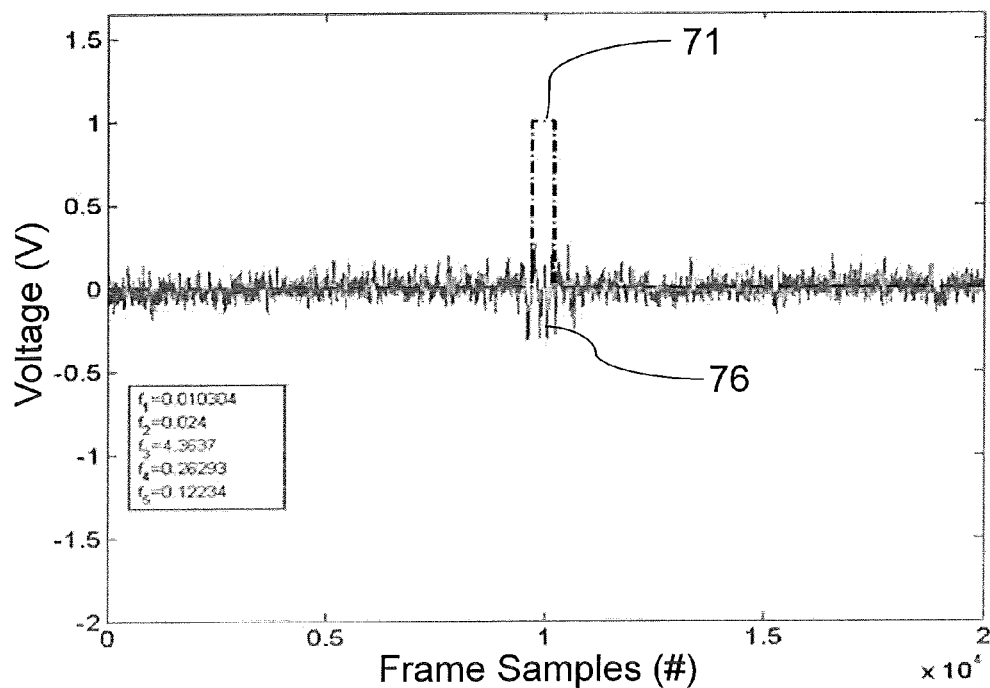

FIG. 7C shows a signal generated by a thumb movement.

Figure 7D:
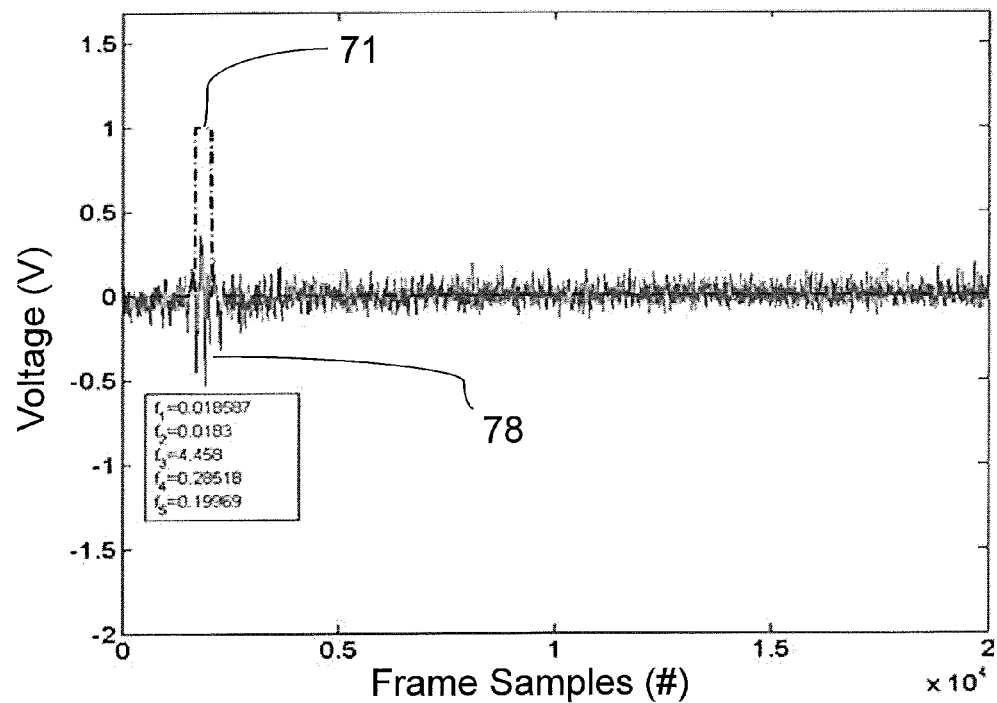

FIG. 7D shows a signal generated by a fist clench movement.

Figure 8A:
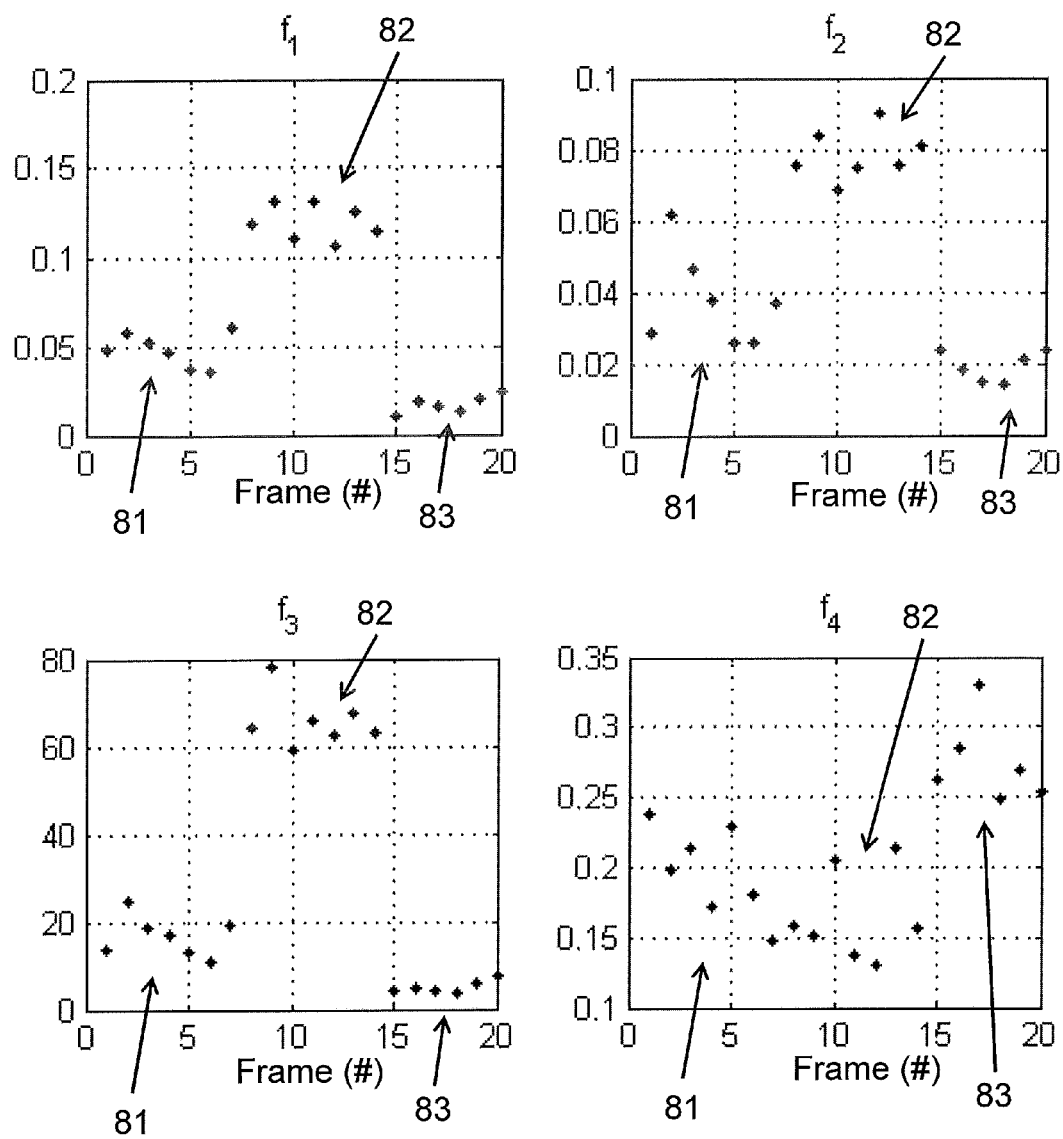

FIG. 8A shows plots for three types of gestures classified according to different features of the sEMG signal, according to an exemplary embodiment.

Figure 8B:
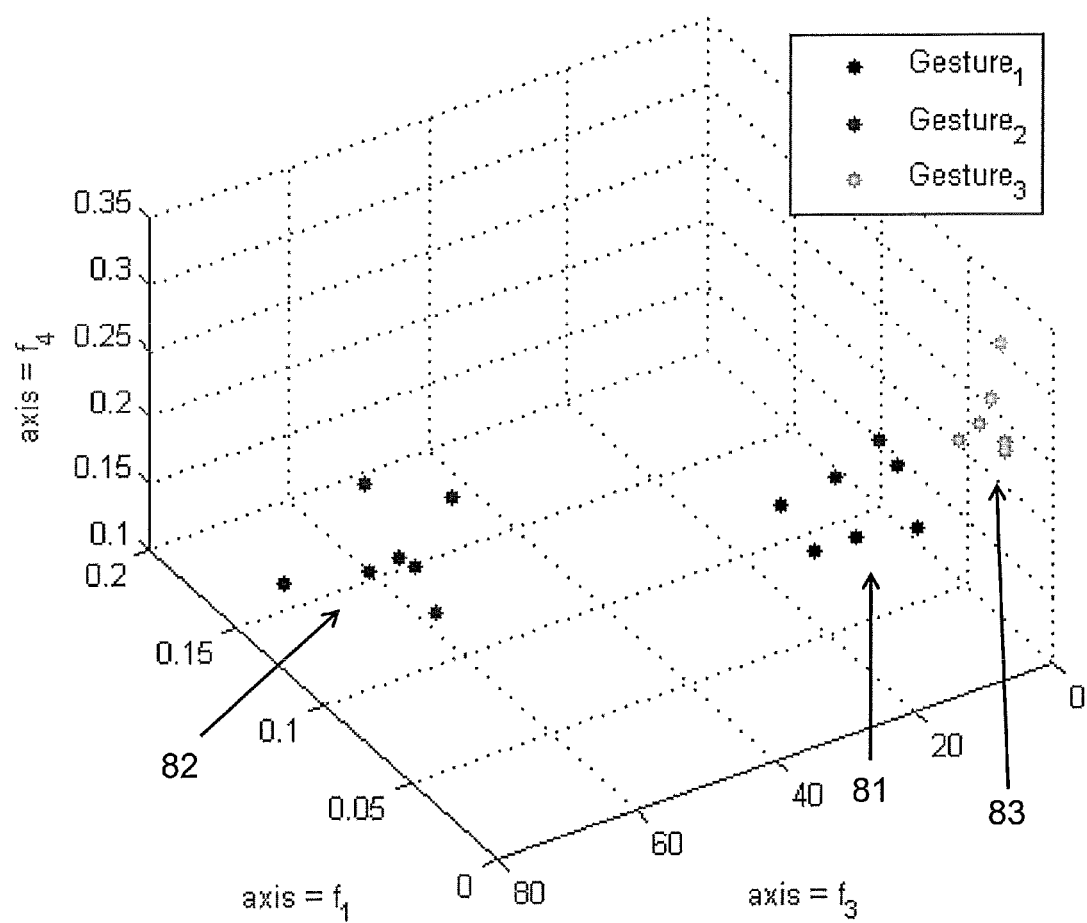

FIG. 8B shows a three dimensional plot including prominent features measured for the three types of gestures.

Figure 9:
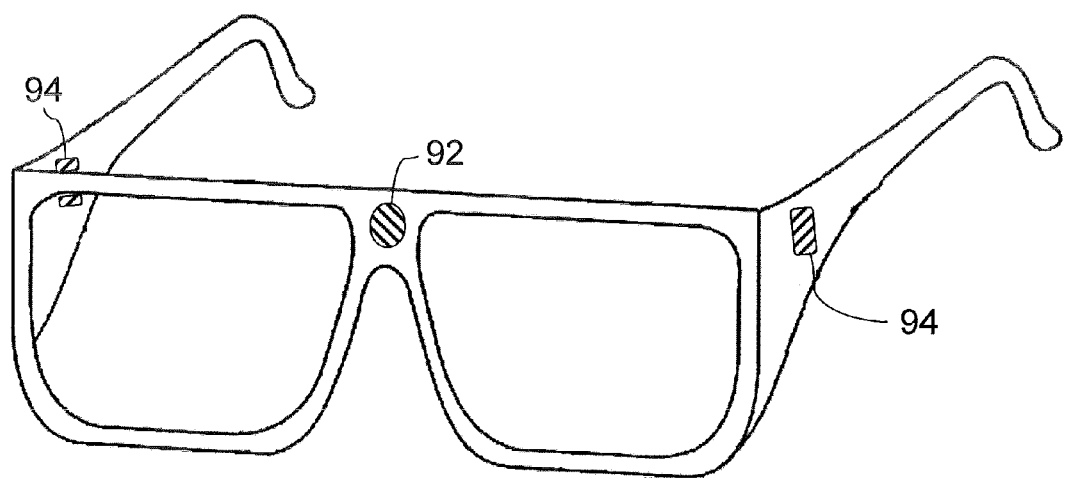

FIG. 9 schematically illustrates a facial gesture controlled system, according to an exemplary embodiment.

Figure 10A:
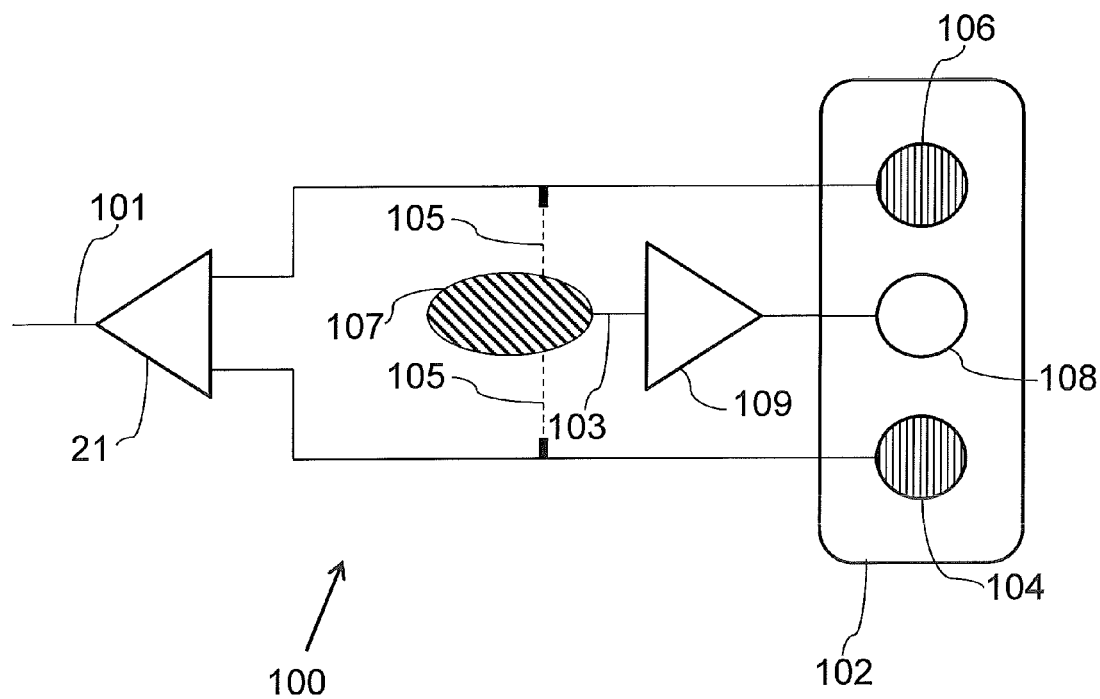

FIG. 10A schematically illustrates exemplary circuitry of a combined sensor and haptic feedback actuator, according to an exemplary embodiment.

Figure 10B:
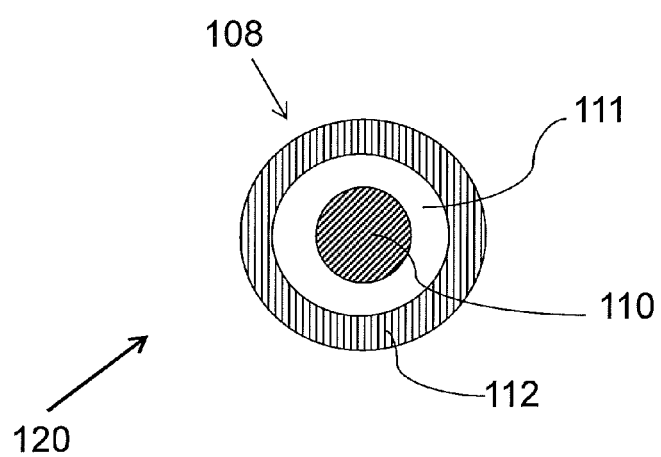

FIG. 10B schematically illustrates a cross-sectional view of an exemplary circuitry of the combined sensor with concentric rings, according to an exemplary embodiment.

DESCRIPTION OF THE PREFERRED EMBODIMENTS

Before explaining at least one embodiment in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For clarity, non-essential elements were omitted from some of the drawings.

FIG. 1A schematically illustrates a frontal view of a flexible user interface 10. The user interface 10 comprises a Printed Circuit Board (PCB) with multiple elements configured to allow an interface between the user and a computerized device (for instance a tablet). The PCB of the user interface 10 is integrated into an elastic substrate 11, so that this user interface 10 may be transfigured by connecting the edges 19 in order to achieve a cylindrical shape capable of fitting onto a limb of a user (such as a flexible strap for a wrist-watch).

The PCB of the flexible user interface 10 comprises a plurality of bio-potential sensors 12 and an array of haptic feedback actuators 14, with a conducting strip 17 having corresponding wiring for these elements. Each sensor 12 may include at least two electrodes 16 in direct contact with the skin of the user, through which the signals are detected.

Optionally, the bio-potential sensors 12 are surface electromyography (sEMG) sensors, and the conducting strip 17 has several conducting layers for electrical power transfer and also for signal transfer. In some embodiments, other sensors are used instead of sEMG, for example capacitive electromyography (cEMG) sensors. It should be noted that electromyography sensors are capable of detecting signals derived from muscle movement, wherein these signals may be transportable along the limbs.

Preferably, the bio-potential sensors 12 are surface nerve conduction (SNC) sensors, capable of detecting nerve signals from the carpus, wherein these signals are caused by movement of the user. Specifically detecting signals from the three main nerves: the Median nerve, the Ulnar nerve, and the Radial nerve, as performed in standard medical diagnostic nerve conduction studies. It should be noted that in embodiments comprising SNC sensors, at least three SNC sensors may be required in order to accurately detect the nerve activity from the three main nerves (i.e. one sensor for each main nerve).

The PCB further comprises a wireless communication controller 13 providing wireless communication (e.g. with a Bluetooth transceiver) to nearby devices, and also motion sensors 15. These motion sensors 15 are preferably Micro-Electro-Mechanical Systems (MEMS) and may include an accelerometer (detecting acceleration), a gyroscope (detecting orientation), a magnetometer or any other combination of suitable sensors.

The correction achieved with this system may give a more accurate solution for gesture recognition than available with other systems, since the combination of the built-in accelerometer and gyroscope associated data provides movement information (with all possible orientations) which is not possible with only an accelerometer. Optionally, the bio-potential sensors 12 may be aligned in a configuration of multiple pairs in order to detect different sources of electric activity, since each nerve creates a signal in a specific location (for instance a sensor on the back side of an arm may not detect signals of movement on the front of the arm).

In a preferred embodiment, the communication controller 13 is a Bluetooth Low Energy (BLE) controller providing reduced power consumption for wireless communication.

It should be noted that the array of haptic feedback actuators is used as a user tactile feedback mechanism, instead of a screen based visual feedback, thereby creating a closed loop feedback. Closed loop feedbacks are an essential component for the success of any interface, as has been shown for prosthesis control by Jiang N. et al., "Myoelectric control of artificial limbs—is there a need to change focus", IEEE Signal Processing Magazine (2012), Vol. 29, No. 5, pp. 152-150, where the conclusions are relevant to human computer interaction in general. Such closed loop feedback can be learned by any user with minimal conscious effort and provides an important layer in human adaptation to such interface.

The sensors 12 may have a differential configuration, corresponding to the nature of the detected signal, and capable of detecting the electrical action potential generated in proximity to these sensors, by measuring the voltage difference between at least two corresponding electrodes 16 for each sensor 12. Such electrodes 16 are typically dry electrodes that may engage the skin of the user without requiring an additional substance (such as a gel) to improve skin conductivity. Thus, if the bio-potential sensors 12 are attached to the body of the user, every motion may be detected by these sensors due to the generated electrical action potential. With proper calibration of the received signal for known movements (e.g. a fist clench), it may be possible to associate any signal received by the bio-potential sensors 12 with a movement of the body. Optionally, the distance between adjacent electrode pairs of bio-potential sensors 12 is ~1.5 cm, an optimal distance corresponding to known signal propagation rates in the body. In some embodiments, at least a portion of the user interface is rigid and not completely elastic (for example, similarly to hand watches).

Optionally, the conducting strip 17 is further connected to a reference driver 18 located at a predetermined position in the elastic substrate 11. This reference driver 18 restricts the electromyography input voltage to a predefined range, and may reject common noise such as fluorescent radiation and also standard 50 Hz/60 Hz radiation from power lines (causing noise in the measurement). It should be noted that a single reference signal from the reference driver 18 is used for all of the bio-potential sensors 12, and this is in contrast to typical use of sensors where each sensor typically drives its own reference through a driven right leg (DRL) circuit. Thus fewer elements may be used (and therefore consume less power and space) while keeping high accuracy of the sensors 12 since the quality of the output signal in the flexible user interface 10 does not degrade (as was shown in several tests carried out with this configuration). Optionally, it is also possible to use the common DRL mechanism instead of the aforementioned configuration.

In a further embodiment, each sensor from the bio-potential sensors 12 is also connected to an automatic gain controlled amplifier (AGC) in order to reduce signal variability (further described hereinafter). Optionally, all bio-potential sensors 12 are activated but only sensors detecting clear signals pass the data for further processing.

FIG. 1B schematically illustrates a cross-sectional view of the flexible PCB user interface 10 surrounding a wrist 5 of a user. In this configuration all of the bio-potential sensors 12 and all of the haptic feedback actuators 14 are in direct contact with the skin of the wrist 5. Thus, any movement by the user's wrist 5 corresponds to an electrical action potential generated at the nerves and followed by potentials at the muscle cells, and may be detected by the bio-potential sensors 12. Additionally, the motion sensors 15 may detect some movements (due to change in position and orientation) that are not detected by the bio-potential sensors 12 as some gestures require little or no muscle movements at the measured area and therefore no noticeable electrical action potential is measured. Optionally, the user interface further comprises a display (for instance similarly to a display on a smart-watch) as an interface for the system.

By initially calibrating such movements or gestures according to the detected signals by these sensors, it will be possible at a later stage to associate a received signal with a gesture so that a user-computer interface may be created and tuned to a specific user. Such calibration processes are further described hereinafter. Once the calibration is complete, deciphering hand gestures (for instance in case that the flexible PCB user interface 10 surrounds a wrist) may allow controlling and operating devices having a computerized interface (such as PC, television or tablet) or other wearable devices (such as a smart-watch), wherein each gesture corresponds to a command received by the computer. This feature may perfect or even replace the current touchscreen interfaces.

In some embodiments, such an array of sensors may be integrated into the wrist band of an existing smart-watch, or alternatively may serve as a stand-alone device. Processing the data from these sensors may be accomplished with real-time "machine learning" using a digital signal processing unit (DSP) in the device. Optionally, such an array of sensors may be integrated into the wrist band of an existing standard watch, thus turning it into a smart-watch.

It should be noted that in a similar way the flexible PCB user interface 10 may surround a different part of the users body (typically surrounding a portion of a limb), wherein the bio-potential sensors 12 and the haptic feedback actuators 14 are in direct contact with the skin of the user. Optionally, this interface is imperceptible by the body such that users may move freely without disturbances from the device to their skin.

FIG. 2 depicts a block diagram of a gesture controlled system 20, showing the information flow between the user interface 10 and a computerized device 29 (wherein the direction of the arrows indicates the direction of the information flow). The user interface 10 detects gestures and movements by the user (as described above). A signal processor 22 conditions the detected signals and applies a label to a dataset such that specific movements by the user are paired with commands corresponding to such known gestures which are transmitted to the computerized device 29. Thus the computerized device 29 may be controlled by the user interface 10, whereby the computerized device 29 may be any device having a computerized interface such as smartphones, PC, tablets, televisions, etc.

The user interface 10 detects gestures using the bio-potential sensors 12 and the motion sensors 15 (as described above). In order to enhance the received analog signal from the bio-potential sensors 12, additional amplification electronics 21 may be coupled to each bio-potential sensor 12, wherein the amplification electronics 21 may be embedded into the substrate 11 of the flexible user interface 10 (shown in FIG. 1A). Preferably, the electronics 21 may comprise an analog amplifier and/or an analog-to-digital converter (ADC), such that the analog signal is amplified and then converted to a digital signal for further processing at a later stage. In addition, each bio-potential signal 12 may also be coupled to an analog-gain-controller (AGC) such that the gain of the amplification electronics 21 is equalized, in order to assure a suitable voltage range.

The information received from the bio-potential sensors 12 and the motion sensors 15 is sampled in real-time and transmitted to the dedicated signal processor 22, wherein the signal processor 22 may be embedded into the substrate 11 of the flexible user interface 10 (shown in FIG. 1A). The signal processor 22 may perform basic signal conditioning processes and then derive a set of indicators for each signal. The signal processor 22 may then identify specific combinations of signals from these indicators, for instance using the methods of dimensionality reduction.

All data arriving to and from the signal processor 22 is stored in a flash memory module 24 in order to allow uploading of all such data to a database in a remote computerized device or a cloud based service. Such data may be gathered for analysis at a later stage for example in order to develop additional features requiring large amounts of exemplary data. In some embodiments, there is no need for a separate memory module.

In order to identify a particular gesture, the system 20 performs a classification process by sampling the memory module 24 and using predetermined internal parameters in order to assign the gesture to one of N+1 symbols ("N" being the known symbols, and a "NULL" symbol representing static mode when the user has not made a gesture). Once a particular gesture is classified as a symbol 26, the classified symbol 26 is transmitted as output to the communication controller 13. Thus, only known gestures are identified by the signal processor. Optionally, an immediate feedback of the symbol 26 may be transmitted 23 to the symbol feedback control 28.

The communication controller 13 may then transmit the classified symbol 26 as a corresponding command to the computerized device 29 via wireless communication (indicated with a dashed arrow). Once the computerized device 29 receives the command, an additional signal may be transmitted back to the communication controller 13 also via wireless communication, for instance a signal indicating that the command has been carried out. Alternatively, no signal is received from the computerized device 29 and the process stops here.

The communication controller 13 may transmit the corresponding signal from the computerized device 29 as input for the user interface 10. The received signal is then recognized by a symbol feedback control unit 28 that activates a corresponding haptic feedback to the user, using the haptic feedback actuators 14.

For example, the user makes a hand gesture corresponding to the command "open" (based on a calibrated set of commands). This command is classified as a symbol 26 and immediate feedback (i.e. data corresponding to the command) 23 is generated at the symbol feedback control 28 correspondingly. Simultaneously, the command is transmitted to a computerized device 29 interface such as that of a "smart television" via the communication controller 13. Once the "open" command is carried out, the television may send a signal back to the user interface 10 so that the user gets a haptic feedback without the need for direct eye contact between the user and the television.

This may be achieved with proper calibration giving appropriate sensory feedback identified for recognized hand gestures. A closed feedback loop is formed such that over time a relationship is created between the gestures of the user and the received feedback. In this way, the user may also "read" a sequence of symbols from the computerized device 29 by identifying the received haptic feedback. For example, user receives a text message and senses such a message using the haptic feedback mechanism 14, without the need for direct eye contact between the user and the computerized device 29. Such an example may be particularly relevant to a driver operating a vehicle, or to a visually impaired user.

In a further embodiment, once the computerized device 29 receives a recognized command, an auditory feedback is created such that the user may hear that the required command has been received and/or executed. Optionally, only an auditory feedback is carried out without a corresponding haptic feedback by the haptic feedback mechanism 14.

It should be noted that the user interface 10 described in FIGS. 1A-1B may further include additional elements in order to increase the accuracy of the gesture detection. Some of these elements are described hereinafter.

FIG. 3 depicts a block diagram of a gesture controlled system 30 having additional heart rate sensors 32, showing the information flow between the user interface and a computerized device 29 (wherein the direction of the arrows indicates the direction of the information flow). The user interface 33 is further equipped with a plurality of heart rate sensors 32 that may detect the heart rate of the user (this feature is already available as an embedded element in some smartphones), for example optical sensors with a light beam penetrating the skin and bouncing off the blood vessels. Typically, the heart rate does not change during rest so the heart rate sensors 32 may provide cognitive effort/strain recognition.

The detected heart rate may be used as an indicator of the user's concentration during calibration of the system, wherein the user is training to create specific gestures and recognize haptic feedback patterns. If the heart rate sensors 32 indicate that the user is concentrated then the calibrated gesture may be assigned with a higher index, so that this specific gesture may be weighted differently, thus refining the calibration process. Additionally, the concentration of the user may be used to improve the entire communication process between the user and the computerized device 29 as unintentional gestures may be disregarded if the signal processor 22 does not receive the required indication from the heart rate sensors 32.

In a further embodiment, at least one skin conductivity sensor capable of measuring the skin impedance of the user may be provided, such that the calibration process may be carried out when a predetermined value of the skin impedance is measured. Optionally, the at least one skin conductivity sensor may be further combined with pulse and muscle tone sensors may provide optimal identification for the user's stimulation or concentration.

FIG. 4A depicts a block diagram of a gesture controlled system 40 wherein all processing is carried out at a computerized device (the direction of the arrows indicates the direction of the information flow). In this embodiment 40, the signal processor 22, the flash memory 24, and the classified symbol 26 are all elements of the computerized device 49.

A signal from the user interface 43, namely from the bio-potential sensors 12, the motion sensors 15 and/or from the heart rate sensors 32, is transferred as output from an output controller 42 to the communication controller 13. This output may then be transmitted via wireless communication to the computerized device 49 in order to process these signals (as described above). The classified symbol 26 is transferred to a command processor 44 of the computerized device 49 so that the required command may be carried out.

In the case that a signal is transmitted back to the user (for instance in the case the command has been carried out), the signal that was transmitted via wireless communication to the communication controller 13 is transferred to the symbol feedback control unit 28 and finally to the haptic feedback actuators 14. It should be noted that the process carried out in this embodiment 40 is similar to the process described for the previous embodiments, wherein the main advantage having all processing carried out externally to the user interface 43, is saving space to be utilized for other applications. Additionally, electrical power may be saved at the user interface 43 as all power consuming computing is carried out remotely at the computerized device 49, so that a battery of the user interface 43 may last longer.

Prior to initial use of the gesture controlled system, a calibration of the system needs to be carried out. The calibration process is utilized as a signal detection mechanism which initially sets values for a resting mode (i.e. NULL gestures) where the only input should be noise, with a predetermined number of iterations. The calibration of the signal from the bio-potential sensors is carried out with the "double threshold" method in order to eliminate false information when carrying out signal calculations. This method has been described to be successful at detecting signal bursts in noisy background environments with sEMG in Bonato P. et al., "A Statistical Method for the Measurement of Muscle Activation Intervals from Surface Myoelectric Signal During Gait", IEEE Transactions on Biomedical Engineering (1998), Vol. 45, NO. 3, pp. 287-299, and also in Severini G. et al., "Novel formulation of a double threshold algorithm for the estimation of muscle activation intervals designed for variable SNR environments", Journal of Electromyography and Kinesiology (2012), Vol. 22, pp. 878-885.

In the next step, the system learns to differentiate between different gestures (for instance a particular movement of the hand or of a specific finger). A user indicates that a specific gesture is performed, according to which the system learns a predefined set of internal parameters typical to the specific user. The system then stores these parameters in the internal flash memory. The user repeats this process N×M times, where N represents the number of gestures that the system detects at low error, and M represents the number of repetitions for the specific gesture. For example, repeating the gesture symbolizing the letter "E" twenty times, whereby different users may use different gestures to represent the same letter "E". Optionally, each user learns specific gestures based on a predefined training set.

In a further embodiment, the user interface is provided with an initial expanded training set. As most people have similar muscle activity for the same gesture, an initial training model may be attributed to a large group of people. An example of an efficient gesture prediction model which may utilize such large amounts of data is the "deep learning" method. Thus, an expanded training set may be provided together with the specific training set so that the user only learns the predetermined gestures (in a short period of time) instead of performing the full calibration process. An expanded training set may be applied to various populations, by matching a user to a model using user information. For example, a male user can be assigned to an expanded "male gesture model".

FIG. 4B depicts a block diagram of a gesture controlled system 41 with an input/output interface (the direction of the arrows indicates the direction of the information flow). In this embodiment 41, the sensor array 12 and the haptic feedback actuators 14 function together as a generic input/output (I/O) interface for sensory substitution. In this configuration, electrical signals may be conditioned in the signal processor 22 and fed back directly to an I/O user interface 45 via an electro-tactile and/or vibro-tactile stimulator 48, not requiring a discrete classification. Such I/O interfaces may fully replace or augment various body sensory capabilities. For example, as a camera for the blind, as an inertial measurement unit (IMU) for people with vestibular loss or as a microphone for a deaf user that may be translated into direct tactile sensory input. Such examples and other uses are for instance discussed in Bach-y-Rita, P., "Tactile sensory substitution studies", ANNALS-NEW YORK ACADEMY OF SCIENCES (2004), Vol. 1013, pp. 83-91.

In some embodiments, all gestures and symbols are chosen so that simplest and shortest gestures are to be used to express the most common letters, syllables, words and sentences in the language of the user. In this way it may be possible to write faster than existing methods as direct eye contact is no longer required. An example of an implementation of this principle can be seen in Braille writing which can represent all the letters of the alphabet, as well as common English suffixes "tion", "ing" and common words like "the", "and". Thus writing text through trained gestures; or reading text through haptic feedback may be achieved.

In a further embodiment, the gesture controlled system may detect hand writing when the user holds a writing instrument (e.g. a pen). In this embodiment the system detects signals caused by muscles activated due to movement of the hand while writing.

In a further embodiment, the gesture controlled system may be used with a dedicated gesture based operating system, wherein all basic commands are gesture and haptic feedback oriented. With such an operating system, a screen will be optional as direct eye contact with the computerized device is not required. The interface of such an operating system may be purely command based, without a screen or a mouse and therefore may be particularly compatible with "Internet of Things" devices such as smart refrigerators.

FIG. 5 depicts a flow chart for writing text, using the gesture controlled system. Initially, the user interface is activated 50, wherein the user interface is connected to a computerized device via wireless communication. The system waits until signal activity is detected 52, either with the motion sensors and/or with the bio-potential sensors. While no movement is detected 51*a* the system returns to the initial state. Once a movement is detected 51*b*, the system checks whether the movement is a recognized gesture 54. If the movement is not a recognized gesture 53*a*, the system returns to the initial state until another signal activity onset is detected. Otherwise, if the movement is a recognized gesture 53*b*, a relevant haptic feedback, in addition to the execution of a command (if such command is applicable) is sent to the user 56 so that the user knows the correct gesture was registered, thereby forming a closed "human-machine" feedback loop.

Next, the system checks whether the recognized gesture is a full symbol 58 since a particular symbol (e.g. the letter "C") may include a set of several gestures. If the recognized gesture is not a full symbol 55*a*, then the system returns to the initial state until another onset is detected. Otherwise, if the recognized gesture is a full symbol 55*b*, the required command is executed on the computerized device 59. For example, the term "and" is written in a text message. Optionally, the full symbol 58 may further contain a time out mechanism, such that if a predetermined amount of time has passed before a sequence was completed, then all data pertaining to such a sequence is erased.

In a further embodiment, the array of haptic feedback actuators is positioned at the user interface with a configuration capable of creating different patterns. For example, a computerized watering system detects that a particular sprinkler has a malfunction. The watering system may then initially notify the user via the haptic feedback mechanism that the computerized watering system requires attention. Next, the computerized watering system may guide the user to the location of the broken sprinkler by activating different elements in the array of haptic feedback actuators to indicate a direction (for instance a specific actuator combination indicates to move right) until the system identifies that the user reached the broken sprinkler, e.g. using standard location based services.

Referring now to FIGS. 6A-6B, an exemplary use of the Braille language for the gesture controlled system is illustrated. FIG. 6A schematically illustrates the hand 4 of the user. Using the Braille language, gestures may be created by bending the index finger 1, bending the middle finger 2, bending the ring finger 3, or also by rotating 61 the hand 4.

FIG. 6B schematically illustrates the symbol for the letter "C" in Braille 63. In order to make a gesture corresponding to the letter "C" in Braille 63, the user needs to bend the ring finger a3 while rotating 61 the hand 4 and finally bend the ring finger b3. In a similar way all letters of the alphabet may be represented using the Braille language, so that it may be possible to write and/or read text without the need of direct eye contact with the screen. It should be noted the Braille type language can be implemented with various gesture sequences. Optionally, different types of haptic feedback are generated to correspond with specific letters and words.

The main advantages of such gesture controlled systems are:
  Freedom of operation—proficient users can operate a device as described above with a small amount of cognitive resource allocation. This enables such users to simultaneously perform complex operations (such as driving and writing).
  Provide accessibility to modern smart devices for the visually and auditory impaired.
  Releasing the eyes and ears—from looking at the screen and listening to speech.
  Protecting privacy—from possible harm when using voice recognition interfaces, or when the screen is visible to others.

In a further embodiment, the gesture controlled system may be used as a stand-alone product, thus exposing the interface to application program interfaces (APIs) for the purpose of general integration into original equipment manufacturer (OEM) systems that may allow saving resources (electric power, processing power etc.).

Referring now to FIGS. 7A-7D, these figures show graphs of SNC signal behavior detected with a sensor positioned between the Radial and Ulnar nerves, for different gestures carried out by the user. FIG. 7A shows a signal 72 generated from a thumb movement, and FIG. 7B shows a signal 74 generated from an index finger movement. FIG. 7C shows a signal 76 generated from a first little finger movement, and FIG. 7D shows a signal 78 generated from a second little finger movement. It can be easily seen from these figures that different gestures gave different signal behavior, differentiating both in typical time duration of the signal and also in typical electrical behavior detected by the SNC sensors (i.e. different gestures cause different voltage spikes). However, a more accurate algorithm (measuring additional parameters) may be used in order to identify different gestures carried out by the user.

In all of the FIGS. 7A-7D, a binary signal 71 indicates when the system identifies that a gesture has been carried out. Using the double-threshold method (as described above), the noise is ignored and the system only reacts to actual gestures.

Referring now to FIGS. 8A-8B, these figures show exemplary results of a gesture classification algorithm using a single bio-potential sensor. In this exemplary algorithm, the length of a measurement frame is denoted as $N_f$, with signal samples $x_i$ ($x_1, x_2, \ldots x_{Nf}$). The corresponding binary signals (indicating that a gesture is detected, for instance as shown in FIGS. 7A-7D) are denoted as $sig_{det}$ so that the samples of a frame where myoelectric activity is detected are denoted as $sig_{det}=1$, and similarly the samples corresponding to noise are denoted as $sig_{det}=0$. Finally, five exemplary statistical features are defined to classify an SNC signal's properties:

1. Chi-square sum:

$$f_1 = \sum_{i=1}^{N_f} sig_{det}^1(i) \cdot z(i), z(i) = x_{i+1}^2 - x_i^2$$

2. Sum length of detection:

$$f_2 = \sum_{i=1}^{N_f} sig_{det}^1(i)$$

3. Arc length:

$$f_3 = \sum_{i=1}^{N_f} |x_{i+1} - x_i|$$

4. Gini index (dispersion index):

$$f_4 = \frac{\sum_{i:sig_{det}=1} \sum_{j:sig_{det}=1} |x_i - x_j|}{2n^2 \mu},$$

where $\mu$ is the mean and n is the number of positive detected indices wherein $sig_{det}=1$.

5. Mean absolute value:

$$f_5 = \frac{1}{n} \cdot \sum_{i:sig_{det}=1} |x_i|$$

Taking all of these features into account for each measurement may create a signal signature so that different gestures may be differentiated. The first feature measures a signal's activity in the chi-squared statistical distribution domain. The second feature measures a signal's detection length. The third feature measures the activity in the time domain using the absolute derivative. The fourth feature is a modern measure of dispersion. The fifth feature is the mean absolute amplitude.

During the measurement, twenty frames were sampled including three gestures: seven gesture repetitions for index finger movement 81, seven gesture repetitions of a fist clench 82, and six gesture repetitions of little finger movement 83 (in total having twenty frames). All of the above-mentioned features need to be taken into account in order to accurately classify these features.

FIG. 8A shows plots with three types of gestures 81, 82, 83 classified according to different features $f_1$-$f_4$ of the SNC signal. It can be seen from these plots that different gestures gave different pattern behavior, however in order to accurately classify the gestures these features must be embedded in a multi-dimensional feature space so that each gesture is clearly separated and clusters are formed.

FIG. 8B shows a three dimensional scatter plot including prominent features measured for the three types of gestures 81, 82, 83. The axes of this scatter plot are the features $f_1$-$f_3$-$f_4$ which define such a "feature space" as described above. The classification algorithm may use a labeled set of SNC data features and outputs segmentation such that each gesture cluster is separated in the feature space. When a new gesture is sampled and its features (or signature) are calculated, a corresponding "point in the multi-dimensional feature space" will be assigned a segment (i.e. a gesture). It should be noted that only a single SNC sensor was used in this example, and multiple sensors may enable better gesture type recognition and improved generalization performance.

It should be clarified that although the example provided herein uses particular features, one can use other features or algorithms without limiting the scope of the present invention.

FIG. 9 schematically illustrates a facial gesture controlled system 90. In addition to the gestured mentioned above (detected by a system surrounding a portion of a limb of the user), EMG sensors may also be utilized for facial gesture recognition. For example, EMG sensors may detect facial gestures of the *frontalis* muscle (located at the forehead) and the temporalis muscle (located at the temples), as discussed in Hamedi M. et al., "EMG-based facial gesture recognition through versatile elliptic basis function neural network", BioMedical Engineering OnLine (2013), Vol. 12, NO. 73.

Facial gestures cannot be detected by the system fitted onto a limb of the user, and therefore require a different system that may be fitted onto the head of a user while operating similarly to the systems described above since only the type of gestures is changed. Preferably, such a system is embedded into wearable devices such as eye glasses. Such systems may be provided as a stand-alone product (where the eye glasses are not utilized for improved vision), coupled onto existing eye glasses, or embedded into smart-glasses such that the gesture recognition is an additional feature of the glasses.

The facial gesture controlled system 90 is embedded into a device wearable on the head of the user (for instance glasses) and may operate similarly to the system described above (e.g. similarly to the gesture controlled system 20, as shown in FIG. 2). The facial gesture controlled system 90 comprises a forehead EMG sensor 92 corresponding to the *frontalis* muscle and capable of recognizing facial gestures at the forehead. The facial gesture controlled system 90 further comprises at least one temple EMG sensor 94 corresponding to the temporalis muscle and capable of recognizing facial gestures at the temples. Optionally, at least one temple EMG sensor 94 may be coupled to at least one haptic feedback actuator such that the facial gesture controlled system 90 may be calibrated to recognize face gestures, and then the user may receive haptic feedback (at the temples) for the recognized gestures.

Such a system may be useful in at least one of the following:
  Control of computerized devices such as smart-glasses using facial gestures.
  A trained user may be able to recognize facial gestures from the received feedback. In this way two remotely paired users can get remote feedback for each other's facial gestures, and be able to recognize feelings and other nuances that are usually noticed only when meeting face to face. This can enrich electronic communication by conveying feelings and body language along with text, voice and video that is usually being used.
  Control of computerized devices using facial gestures, for users that have physical trouble manipulating their limbs.
  Combining such a system with image processing based facial gesture recognition may help visually impaired users to recognize the feelings and facial gestures of their partner.
  Furthermore, such systems may be used for working with autistic users in order to improve empathic skills.

Referring now to FIGS. 10A-10B, these figures relate to a further embodiment where the haptic feedback is embedded into the EMG sensor. While EMG is the reading of nerve action potentials generated at the muscles, NeuroMuscular Electrical Stimulation (NMES) is actually the opposite action, where electrical signals are used to stimulate the motoric nerves and cause muscular contractions. Electro-Tactile Stimulation (ETS) is the use of electric potentials to activate the nerve fibers connected to the tactile sensory receptors underneath the skin.

Recent studies have shown that NMES and Electro-tactile methods can involve haptic feedback and tactile display, while NMES is usually used to simulate force sensing (such as feeling the resistance of pushing a heavy object) and Electro-tactile display are used to simulate the sense of touch, such as textures. Some examples of these studies may be found in Pamungkas D. et al., "Electro-Tactile Feedback for Tele-operation of a Mobile Robot", Proceedings of Australian Conference on Robotics and Automation, University of New South Wales, Australia (2013), Peruzzini, M. et al., "Electro-tactile device for material texture simulation", IEEE (2012), pp. 178-183, and Kruijff, E., et al., "Using neuromuscular electrical stimulation for pseudo-haptic feedback", Proceedings of the ACM symposium on Virtual reality software and technology (2006), pp. 316-319.

In this embodiment the EMG sensor is combined with the NMES and ETS to create a single unit capable of both sensing EMG and generating haptic feedback. In addition to its immediate use with the gesture controlled system, such a combined sensor-actuator may generate haptic feedback for finger movements to facilitate reading and notification receiving. In particular, such a device may be used in the field of prosthetics where a prosthetic arm may be controlled by an EMG sensor and then provide feedback to the user regarding texture and force. Optionally, the combined sensor-actuator may also be used in the field of remote controlling of computerized robots and machines. In some embodiments, the combined sensor-actuator may further be combined with a pulse sensor and/or a galvanic skin response (GSR) sensor.

An exemplary circuitry that may enable such a combined unit is illustrated in FIG. 10. The amplifier driven right leg (DRL) element 21 of the bio-potential sensor 12 (for instance as shown in FIG. 2) circuitry can be used also as an ETS and NMES stimulator to generate haptic feedback as well as reading muscular electrical potentials. Since the EMG (e.g. sEMG/cEMG) is basically a differential amplifier, the stimulating signal that will be added to the common mode signal driven to the body through the DRL will not be amplified by the EMG sensor.

In standard DRL circuits, the EMG signal 101 is collected at a positive electrode 104 and a negative electrode 106 to be amplified using the differential amplifier 21 to generate an amplified EMG signal. Simultaneously, the EMG signals 105 from electrodes 106, 104 are averaged at a stimulator 107 to generate a common mode signal 103 that is later amplified by an additional amplifier 109 and driven to the user's skin through a reference electrode 108. In this embodiment, a stimulating current signal is combined with the common mode signal at the stimulator 107, going through the same path to the reference electrode 108 where it stimulates the skin nerves.

A further embodiment 120 shown in FIG. 10B, comprises the reference electrode 108 that includes two concentric rings with an internal electrode 110, and an external electrode 112 separated from the internal electrode 110 by a nonconductive material 111, where the stimulating signal is driven to the internal electrode 110 and the common mode signal is driven to the external ring electrode 112. In a further embodiment, the skin conductivity of the user's wrist is measured between the two electrodes by measuring the amplitude generated by driving the current through the impedance of the skin with the bio potential sensor. Since the current is constant and controlled by the device, the measured voltage may change according to the skin impedance.

In a further embodiment, the gesture control system may operate with a dedicated operation system (OS). In this embodiment, the OS may be used to control and navigate the computerized device (e.g. a smart-watch). Having a display, a displayed menu with four icons corresponding to different fingers of the users (for instance the index finger, the middle finger, the ring finger, and the thumb). Such that moving a particular finger corresponds to a particular icon and the selection may navigate to an additional menu (for example, moving the index finger indicates selecting the letter group "A-G"). This operation may be used to navigate through different letters when writing a text message (e.g. with a smart-watch). Furthermore, such OS may operate with dedicated languages (such as the Braille language as shown in FIGS. 6A-6B).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A gesture controlled system wearable by a user and operationally connected to a computerized device, the system comprising:
- at least one bio-potential sensor;
- at least one motion sensor capable of detecting movement;
- at least one haptic feedback actuator capable of creating haptic feedback corresponding to signals from the computerized device;
- a memory module, having a database with known records representing different gestures and a gesture prediction model;
- a signal processor, capable of identifying signal parameters from the at least one bio-potential sensor and the at least one motion sensor as known gestures from the database according to the gesture prediction model; and
- a communication controller capable of transmitting information from the signal processor to the computerized device,
- wherein the at least one bio-potential sensor and the at least one haptic feedback actuator are in direct contact with the skin of the user, wherein identified signals from the signal processor are transmitted to the computerized device, and wherein the at least one haptic feedback actuator is configured to allow reading text from the computerized device, with conversion of the text into different haptic feedback corresponding to specific letters, words and predetermined data types.

2. The gesture controlled system of claim 1, further comprising a display interface capable of displaying information from the signal processor.

3. The gesture controlled system of claim 1, wherein the system is capable of fitting onto a wrist of the user, and detects electrical signals from nerve bundles in the wrist.

4. The gesture controlled system of claim 1, further comprising at least one heart rate sensor capable of detecting the heart rate of the user as additional input for the signal processor.

5. The gesture controlled system of claim 4, wherein the heart rate sensor is selected from a group including an optical sensor, an electrocardiogram (ECG) sensor, and a skin conductivity sensor.

6. The gesture controlled system of claim 1, wherein the bio-potential sensor is selected from a group including a surface electromyography (sEMG) sensor, a capacitive electromyography (cEMG) sensor, and a surface nerve conduction (SNC) sensor.

7. The gesture controlled system of claim 1, wherein the communication controller is a wireless communication controller.

8. The gesture controlled system of claim 7, wherein the wireless communication controller is a Bluetooth Low Energy (BLE) controller.

9. The gesture controlled system of claim 7, wherein the wireless communication controller is configured to allow cloud connectivity between the signal processor and an external data storage cloud.

10. The gesture controlled system of claim 1, wherein the at least one motion sensor is a Micro-Electro-Mechanical System (MEMS).

11. The gesture controlled system of claim 10, wherein the at least one motion sensor is selected from a group including an accelerometer, a gyroscope, and a magnetometer.

12. The gesture controlled system of claim 1, wherein the signal processor is configured to allow detection of hand writing gestures.

13. The gesture controlled system of claim 1, wherein the at least one haptic feedback actuator is an electro-tactile stimulation actuator.

14. A method for communication between a gesture controlled system and a computerized device, the method comprising:
- providing the gesture controlled system of claim 1;
- calibrating the gesture controlled system to recognize a set of gestures;
- detecting a movement by at least one of the sensors;
- checking if the movement is a recognized gesture;
- executing a command corresponding to a recognized gesture from the database on the computerized device; and
- activating the at least one haptic feedback actuator for feedback corresponding to the executed command on the computerized device.

15. The method of claim 14, wherein the method further comprises providing at least one heart rate sensor capable of detecting the heart rate of the user, and wherein the calibration is carried out when a predetermined value of the heart rate is measured.

16. A gesture controlled system wearable by a user and connected to a computerized device having a memory module, having a database with known and labeled gestures and a gesture prediction model, and a signal processor, capable of identifying signal parameters as known gestures from the database, the system comprising:
- at least one bio-potential sensor;
- at least one motion sensor capable of detecting movement;
- at least one haptic feedback actuator;
- a communication controller capable of transmitting information to the computerized device;
- wherein the at least one bio-potential sensor and the at least one haptic feedback actuator are in direct contact with the skin of the user, wherein the processing of the signal from the sensors is carried out at the signal processor of the computerized device, and wherein the at least one haptic feedback actuator is configured to allow reading text from the computerized device with different haptic feedback corresponding to specific letters, words and predefined data types.

17. The gesture controlled system of claim 16, further comprising a display.

18. The gesture controlled system of claim 16, further comprising at least one heart rate sensor capable of detecting the heart rate of the user.

19. The gesture controlled system of claim 16, wherein the communication controller is a wireless communication controller.

* * * * *